United States Patent [19]

Schippers

[11] Patent Number: 5,254,825
[45] Date of Patent: Oct. 19, 1993

[54] APPARATUS FOR THE SEALING OF MEDICAL PLASTIC ARTICLES

[75] Inventor: Alex Schippers, TC Exloo, Netherlands

[73] Assignee: NPBI Nederlands Produktielaboratorium Voor Bloedtransfusieapparatuur en Infusievloeistoffen B.V., Emmer-Compascuum, Netherlands

[21] Appl. No.: 820,040

[22] Filed: Jan. 13, 1992

[51] Int. Cl.⁵ ............................................. H05B 6/54
[52] U.S. Cl. .............................. 219/10.87; 219/10.53; 219/10.73; 219/10.75; 219/10.79
[58] Field of Search ............... 219/10.81, 10.77, 10.79, 219/10.75, 10.73, 7.5, 8.5, 9.5, 10.53

[56] References Cited

U.S. PATENT DOCUMENTS

| | | | |
|---|---|---|---|
| 2,549,399 | 4/1951 | Tawney | 219/10.81 |
| 3,329,797 | 7/1967 | Clark | 219/10.81 |
| 3,701,875 | 10/1972 | Witsey et al. | 219/10.81 |
| 4,013,860 | 3/1977 | Hosterman | 219/10.81 |
| 4,186,292 | 1/1980 | Acker | 219/10.81 |
| 4,205,210 | 5/1980 | Salway-Waller et al. | 219/10.81 |
| 4,221,950 | 9/1980 | Lamberts et al. | 219/10.81 |
| 4,384,186 | 5/1983 | Burt | 219/10.81 |
| 4,390,832 | 6/1983 | Taylor | 219/10.77 |
| 4,488,028 | 12/1984 | Acker et al. | 219/10.81 |
| 4,490,598 | 12/1984 | Minney et al. | 219/10.81 |
| 4,491,711 | 1/1985 | Acker | 219/10.81 |
| 4,496,819 | 1/1985 | Acker | 219/10.81 |
| 4,529,859 | 7/1985 | Minney et al. | 219/10.81 |
| 4,531,038 | 7/1985 | Lillibridge et al. | 219/10.81 |
| 4,629,851 | 12/1986 | Holle | 219/10.81 |

*Primary Examiner*—Bruce A. Reynolds
*Assistant Examiner*—Tu Hoang
*Attorney, Agent, or Firm*—Herbert Dubno

[57] ABSTRACT

The detuning of a tuned network in a sealing head of a device for sealing medical plastic articles is detected and automatically compensated to reduce the overall energy consumption and optimize the sealing process. A secondary capacitor in the tuned network is a variable capacitor controlled by a motor operated by a phase detector to counteract the detuning.

7 Claims, 7 Drawing Sheets

TUBE IN SEALHEAD

SEALING THE TUBE

TUBE WITH SEAL

APPARATUS FOR THE SEALING OF MEDICAL PLASTIC ARTICLES

FIELD OF THE INVENTION

My present invention relates to an apparatus or device for sealing medical plastic articles, for example, the tubes of infusion sets, or blood- and infusion bags or the like, utilizing radio frequency energy for heating the material to be fused.

More particularly, the invention relates to a device for sealing medical plastic articles for use in hospitals, laboratories, bloodbanks through the use of radio-frequency energy and where the electrodes effecting the sealing action form capacitor electrodes in a tuned or resonant network.

In particular, the invention is concerned with the detuning of a sealing head including such a network.

BACKGROUND OF THE INVENTION

For the collection and preparation of donor blood in the bloodbank and for the processing of medical fluids in the hospital, there is an increasing use of bloodbag systems and infusion sets made of flexible plastic, e.g. polyvinylchloride (PVC).

These bags often contain a fluid and are connected to each other by means of flexible plastic tubing. This makes them closed systems that do not lose internal sterility when the fluid is pressed from one bag to another. The tubing of the infusion sets as they are used for the infusion of medical fluids into a patient in the hospital are also generally made of flexible plastic, e.g. PVC.

In addition to advantages in costs, sterilization ability, nonbreakable and medical suitability, one of the major advantages for the use of such plastic systems is the ability to close the tubing hermetically. Methods for hermetically closing this type of tubing are e.g. the clamping of the tubing with a clamp or by means of a lead. However, an even more popular way of closing this tubing is by sealing.

For the sealing of medical plastic tubing, devices are already on the market, for example, those marketed by Sebra of Tucson, Ariz., U.S.A. Devices of this type contain an electrical circuit for the generation of energy and a pair of electrodes, the sealing jaws, between which the tubing to be sealed is introduced. The generated energy is conducted to the electrodes and causes a local heating of the tubing. When sufficient energy is delivered to the sealing jaws and when these jaws are pressed toward each other at the same time, a seal is formed in the tubing. In general, the generated energy is of a high frequency or radio frequency (RF) form, where the sealing jaws function as capacitor plates.

This technique is described inter alia in U.S. Pat. Nos. 4,013,860, 4,186,292, 4,390,832, 4,490,598, 4,529,832, 4,488,028, 4,491,711 and 4,496,819, all assigned to Engineering & Research Associates Inc., of Tucson, Ariz., U.S.A.

The devices described in these patents contain an RF generator that generates electrical energy with a fundamental frequency of 40.68 MHz, connected to a sealing head through a 50 Ohm coaxial cable. The sealing head contains a resonance circuit that transforms the applied energy to a high voltage. This high voltage, approximately 1500 volts, is necessary to generate enough heat in the PVC to make it melt.

In this sealing process, the plastic tubing is introduced between the two sealing jaws, the capacitor plates, and these jaws are pressed together. The tubing will now be heated when the RF field is generated between these jaws. This heating will make the tubing dent under the pressure of the two jaws and the jaws will approach each other. This will increase the RF field and subsequently increase the generated heat and dent the tubing even more, etc.

This avalanche effect melts the PVC tubing, thereby forming a seal. The process depends on the thickness of the tubing, the amount of RF energy and the force that clamps the jaws together. A normal sealing procedure will take about 1 or 2 seconds. The RF energy can now be stopped and a cooling time of approximately 1 second can be effective.

The heat is generated because the dipole of the PVC molecule vibrates in the RF field. As the vibration of the dipoles increases in intensity the more intensive the dipoles vibrate, the greater will be the generation of heat. There are, however, limitations. Strongly vibrating dipoles can fall apart decay into in charged particles that can collide with other dipoles, which will thereupon decay apart, etc. Thus a chain reaction will develop, generally called a breakdown, which will cause generation of so much heat, that the material will burn.

The vibration intensity has a direct connection with the power level of the electric field that is built by the sealing electrodes. To attain a good heat development, it turns out to be necessary to developed up a strong electrical field. The critical breakdown level should however never be reached. It is, therefore, of vital importance for good seal quality in a medical plastic articles that between the sealing electrodes a strong (exceeding the breakdown value) and particularly constant, electrical field is generated which, however, should not exceed the breakdown level.

A sealing apparatus for the sealing of medical plastics generally consists of two main parts, the energy generator and the sealing head, that is responsible for development of the electric field between the two sealing jaws. The sealing head, therefore, contains a resonance circuit or resonant network.

In general, to "resonate" means to "vibrate simultaneously". In this special case, we talk about an electric circuit that is able to oscillate in consonance with an external frequency. In normal mechanics, resonances are commonly known. A tuning fork for instance will only vibrate when a tone is offered that is equal or almost equal to the resonant frequency of this fork. It will not react to any other tone or frequency.

In electronics, one can build a similar resonant circuit with a capacitance (capacitor) and an inductance (coil). In such a circuit, a constant exchange of energy levels between the magnetic field of the coil and the electric field of the capacitor will take place. This circuit will in theory be in resonance when the apparent resistance of both components is equal, i.e. when:

$$2\pi f L = \tfrac{1}{2}\pi f C$$

with
f=resonance frequency in Hertz
L=self-induction in Henry
C=capacity in Farad, As has been stated before, the sealing head contains such a resonant circuit. The voltage undergoes a resonance rise to a higher level, where the sealing electrodes serve as capacitors. From the description of the resonant circuit, it seems clear that it is important for a maximizing in the rise, that the circuit is tuned exactly to the frequency of the supplied signal.

This means that:

$$f = 1/2\pi \sqrt{LC}$$

wherein:
f=the resonance frequency of the circuit in Hertz
L=self-induction in Henry
C=capacity in Farad.

The self-inductance generally consists of a couple of coils, fixed on a support. The sealing electrodes serve as the capacitor, and when those components are designed correctly, this circuit will be in resonance with the frequency of the supplied electrical signal.

Different phases characterize the sealing process. The process starts by the formation of the electrical field which will heat the plastic. Due to the pressure applied to the electrodes, the tubing will dent and the distance between the electrodes will decrease. Depending on the dimensioning of the resonance circuit, this will now either be tuned or detuned. The sealing power will accordingly increase or decrease.

In the second case, the sealing process will prematurely end itself. The seal stays relatively thick and there is no actual melting of the plastic. The seal quality will be bad.

In the first case, an avalanche effect will take place that ends with a great heat development that will melt and seal the plastic. Thereafter the energy can be switched off and a cooling phase can start.

Thus the resonant circuit should be designed in such a way that the resonance point is not too early in the sealing process. However in certain circumstances, low temperature or stiff tubing, this resonance point will not even be reached within the set sealing time and there will be no sealing at all. Extension of the sealing time is not desired because of production time loss.

However a problem arises during the sealing process. Because the plastic heats up in the electric field between the sealing electrodes, these electrodes will move towards each other when pressure is applied to them. This will influence the capacitance of the capacitor.

$$C = A\epsilon/s$$

where
C=capacitance of the capacitor
A=surface of the capacitor plates
$\epsilon$=dielectric constant
s=distance between the plates The capacitance of the capacitor increases with a decreasing distance of the plates. Moreover the dielectric constant of many types of material is strongly dependent on the temperature.

During the sealing process of PVC this constant increases six times for 27 MHz between 20° C. (ambient temperature) and 140° C. (melting temperature), so that the temperature rise alone can increase the capacitance of the capacitor six times.

Due to the increasing capacitance, the resonant circuit in the sealing head will detune itself during the sealing process, which will cause less resonance rise and less heating power.

Detuning of the resonance circuit can also be caused when a tubing filled with a fluid is introduced between the sealing electrodes. Most fluids are excellent conductors, thereby apparently decreasing the apparent distance of the capacitor plates. Other causes of detuning can be different materials that are to be sealed (with different dielectric constants) and aging of the components.

Thus the detuning of the resonance circuit during the sealing process or caused by other factors has an unfavorable influence on the sealing quality. It also has an unfavorable influence on the effect of possible electronic filters that are meant to suppress spurious radiation.

All these disadvantages indicate the need for a sealing head provided with a resonance circuit which will stay in resonance during the complete sealing process.

OBJECT OF THE INVENTION

It is the principal object of the present invention, therefore, to provide an improved apparatus or device for the sealing of medical plastic articles whereby the drawbacks of the earlier systems can be obviated. A more specific object of the invention is to provide a device for sealing medical plastic articles like plastic tubing and blood- and infusion bags, whereby energy consumption is reduced, the danger of breakdown of the plastic is avoided and, in general, the sealing action is rendered more efficient than has been the case heretofore.

Yet another object of this invention is to provide an improved method of sealing medical articles of the type described which can take advantage of the improved apparatus and which will avoid drawbacks of earlier methods.

SUMMARY OF THE INVENTION

These objects are attained, in accordance with the present invention, in a device for sealing a medical plastic article which comprises:

a sealing head having a pair of electrodes adapted to receive the article between them and actuatable to compress the article between the electrodes;

a radio-frequency generator connectable to the electrodes for energizing the electrodes with the article compressed between the electrodes to seal the article, the electrodes forming a primary capacitor in a tuned network of the sealing head; and circuit means connected to the electrodes and to the radio-frequency generator and including an adjustable secondary capacitor, for detecting detuning of the sealing head and automatically correcting for the detuning by adjustment of the secondary capacitor.

Advantageously, the secondary capacitor is a variable capacitor driven by an electric motor which, in turn, responds or is powered by a balance detector having a first input receiving a signal representing a phase of a voltage applied across the electrodes and a second input receiving a signal representing a phase of a current through the electrodes.

The circuit means can include a current transformer on a line connecting the radio-frequency generator with the network and connected, in turn, to the second input. Clamping-diode means can be provided between the current transformer and the second input.

The network can include an inductance with the radio-frequency generator being connected to the inductance. A clamping-diode network is also connected between a line from that generator to the inductance and the first input of the balance detector.

According to the method aspect of the invention, the method of sealing the plastic medical article can comprise the steps of:

(a) clamping a plastic medical article to be sealed between a pair of electrodes;

(b) energizing the electrodes by connecting a radio-frequency generator to a tuned network in which the electrodes constitute a primary capacitor, thereby sealing the article;

(c) detecting detuning of the network during sealing of the article; and (d) in response to detection of detuning of the network, automatically correcting same by adjusting a secondary capacitor in the network.

The above-mentioned objects are thus surprisingly attained by the application of an electrical circuit at the ingoing line of the RF sealing head, that measures the detuning effect of the sealing heads and compensates this effect through adjustment of a motor driven variable second capacitor.

It has been found to be possible to see if a resonance circuit lies exactly in, before or after the resonance point by looking at the difference of phase between the applied voltage and current.

In a resonant circuit that lies before the resonance point, where the resonance frequency is higher than the supplied frequency, the contribution of the coil will be greater than that of the capacitor, $(2\pi fL > \frac{1}{2\pi fC})$, so the circuit will behave inductively. It is a known fact that for an inductance, the current will lag the voltage. When however a circuit lies after the resonance point, the contribution of the capacitor will be greater and the circuit will behave capacitively. Now the current will lead the voltage.

When a circuit is exactly tuned, the contribution of the capacitor and the coil will be balanced and the circuit will behave as a pure resistance. The voltage and current will be in phase with each other.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
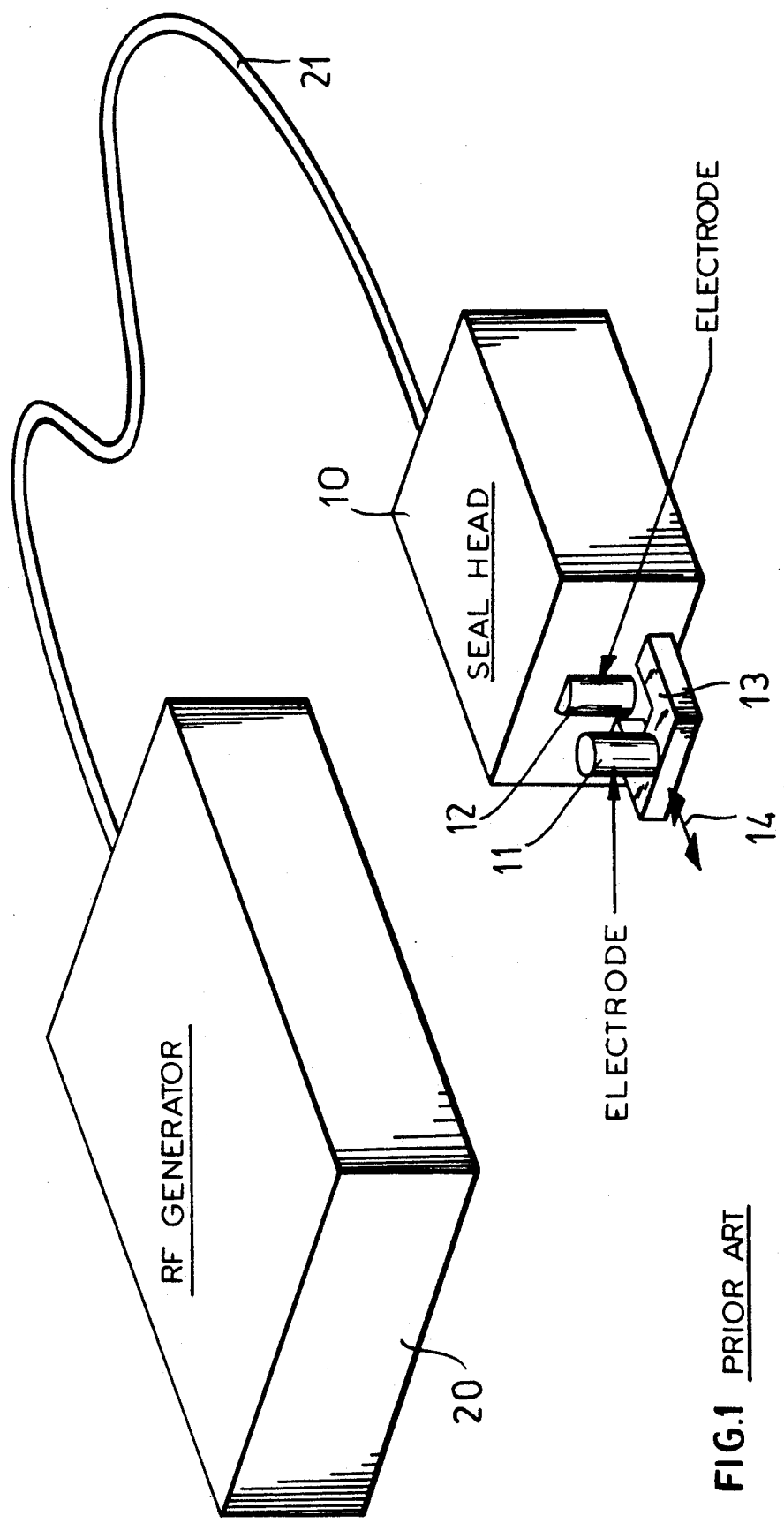
FIG. 1 is a diagrammatic perspective view of a system representing prior art as described in, for example, the U.S. patents mentioned.

As has been described in connection with the background of the invention, the sealing head 10 of a device for sealing medical plastic articles such as plastic tubing, can comprise a pair of electrodes 11 and 12, at least one of which may be movable on a support 13 as represented by the arrow 14 so that the tube can be clamped between the electrodes.

The electrodes 11 and 12 can form part of a tuned network and, in the case of the present invention, form the primary capacitor Cl. The sealing head is excited by a radio-frequency generator represented at 20 which is connected to the sealing head 10 by a coaxial cable 21.

Figure 2A:
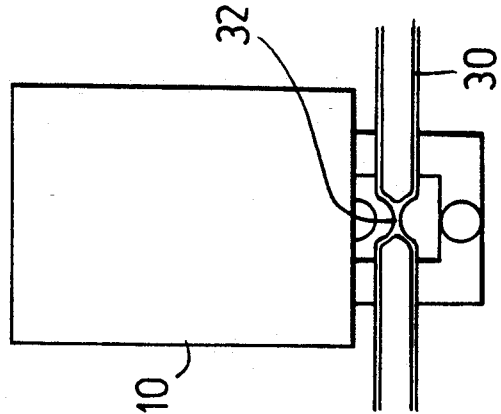
FIGS. 2A –FIG. 2C are diagrams showing the sealing of a medical article utilizing the prior art techniques and, of course, also the present technique.
Figure 2B:
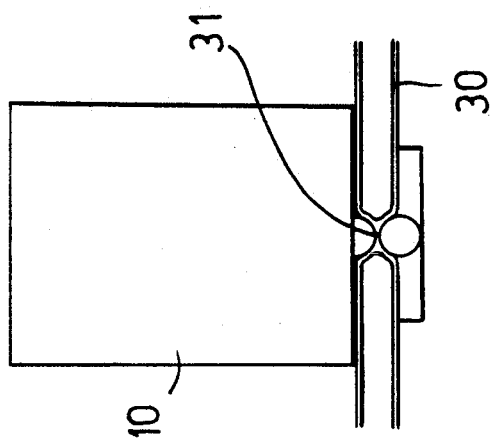

In accordance with the principles described, therefore, the plastic tube 30 can be inserted between the electrodes 11 and 12 of the head 10 (FIG. 2A) and the electrodes drawn together (FIG. 2B) to pinch the tubing 30 at 31 and apply the RF energy.

Figure 2C:
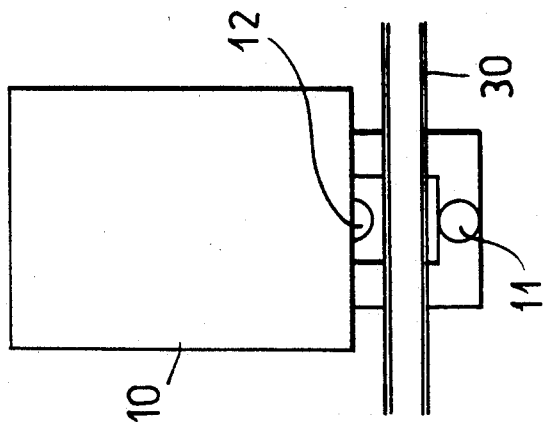

When the tube is sealed, the tubing 30 with the sealed region 32 can be removed from the head (FIG. 2C).

Figure 3:
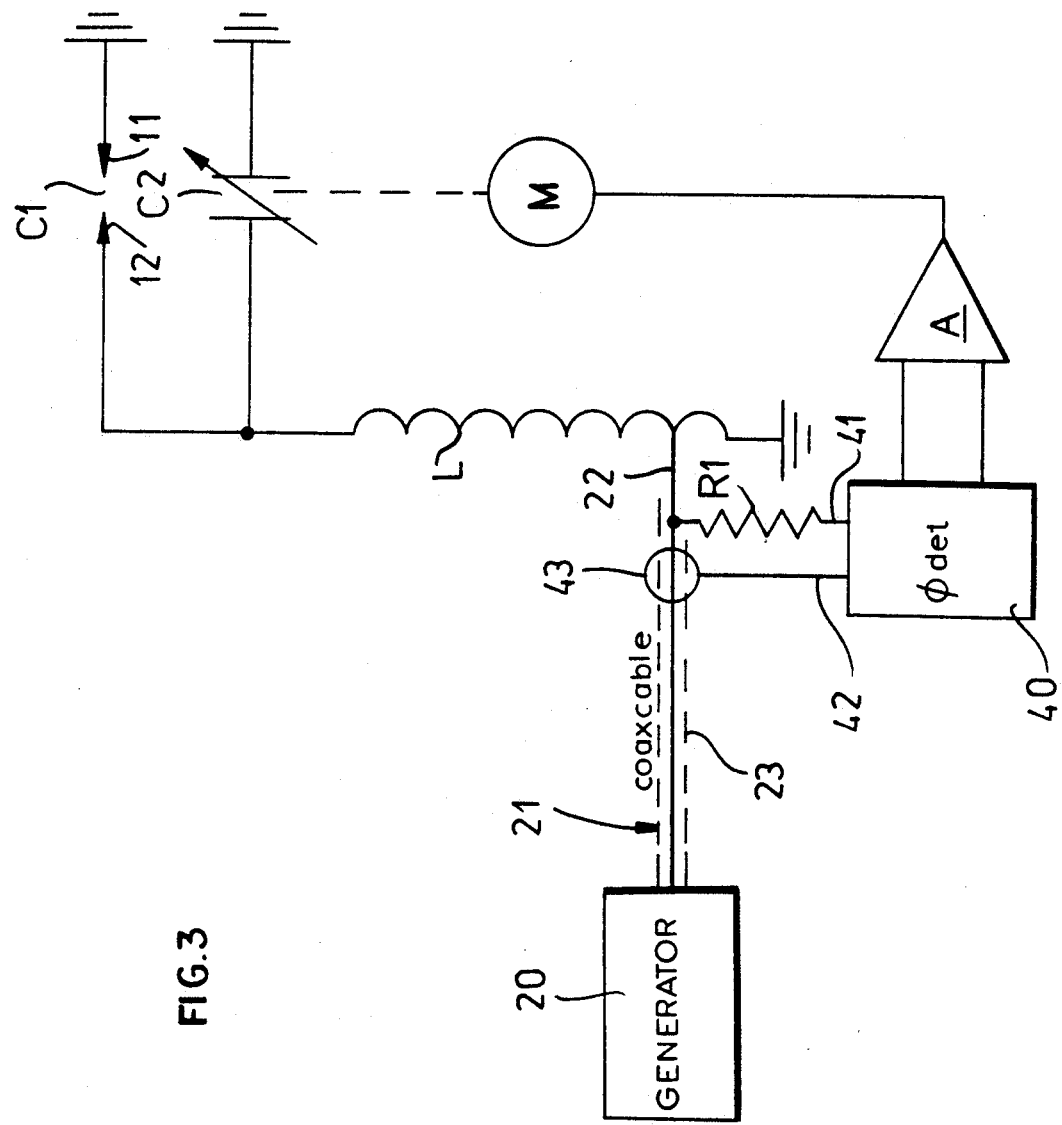
FIG. 3 is a circuit diagram illustrating the principle of the present invention with automatic returning in response to a detuning effect.

As can be seen from FIG. 3, the electrodes 11 and 12 form the primary capacitor Cl, one pole of which is grounded while the other pole is connected to an inductor or coil such as the auto-transformer L, one end of which is also grounded.

According to the invention, the secondary capacitor C2 is connected in parallel with the primary capacitor Cl to the inductor L so that the combined capacitors and the inductance form a tuned network whose natural frequency corresponds to the frequency of the supply of the RF generator 20.

As in the prior art, the RF generator 20 can be connected by a coaxial cable 21 to the tuned network. Unlike the prior art, however, which does not have a secondary capacitor, the secondary capacitor C2 is a variable capacitor driven by a motor M powered through the amplifier A in response to a phase detector 40. In FIG. 3, the phase detector 40 is shown to have a first input 41 receiving a signal representing the phase across electrodes 11 and 12 from a resistor R1 connected to the core 22 of the coaxial cable 21 which is connected to the inductance L.

Figure 4:
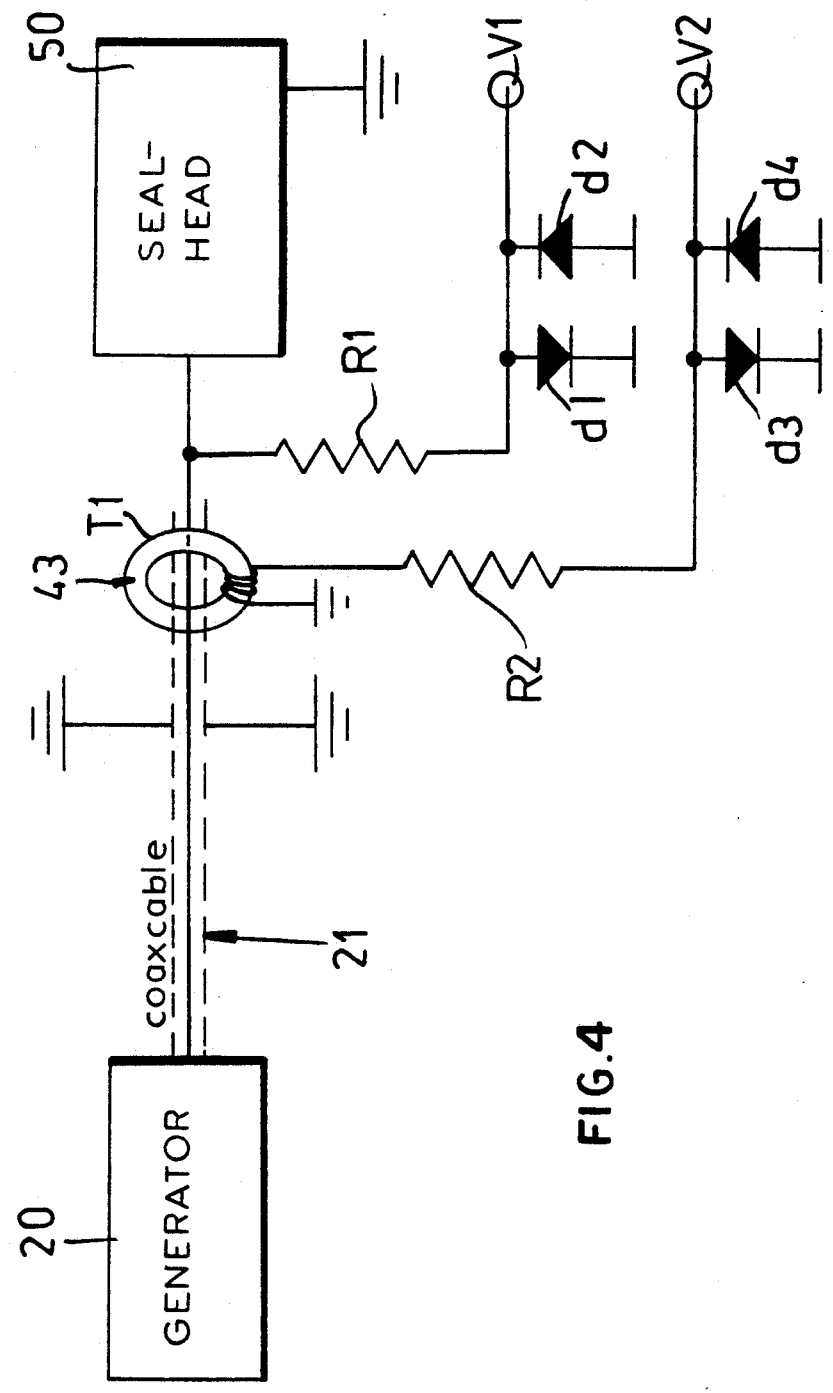
FIG. 4 is a circuit diagram illustrating a means for generating two voltages which can be subject to phase comparison and representing the current through and the voltage across the sealing electrodes.

The second input 42 of the phase detector 40 derives from a current transformer 43 which monitors the current passing through the core 22 of the coaxial cable and hence the current through the electrodes 11 and 12. The sheath 23 of the coaxial cable may be grounded as illustrated in FIG. 4 where the current transformer 43 has been represented at T1. The sealing head of the invention, embodying the auto-tuning circuitry, the motor driving the secondary capacitor, etc., is here represented at 50.

FIG. 3 shows the principles of the present invention. The RF generator supplies an electrical signal of correct frequency and sufficient power via a coaxial cable to a sealing head. This sealing head consists of a resonance circuit, made of a coil and the sum of the two capacitors $C_1$ and $C_2$.

In the resonant network:

$$C_{total} = C_1 + C_2$$

The circuit is designed in such a way that it is in resonance with the supplied frequency. The coupling to the circuit is so (coil ratio dependent on the sealing surface 1:1 to 1:10) that the characteristic resistance of the circuit, the coaxial cable and the qenerator are equal and the power transfer is optimal.

$C_I$ is the capacity of the sealinq electrodes. When the electrodes move during the sealing process, this capacitor will change value as described before.

$C_2$ is part of the invention and is a variable capacitor, a so-called tuning capacitor, suitable for the high sealing voltage used. This capacitor is mechanically driven by an electric motor. The motor is powered by an electronic circuit, also part of the invention.

Essential to the invention is that variation in capacitance of the sealing electrodes $C_I$ is compensated by an equal, but opposite change of $C_2$, causing the sealing head to keep the resonant status.

The electrical circuit makes use of the earlier described effect that before or after the resonance point there will be a phase difference between the voltage and the current.

To detect the phase relation between voltage and current of the sealing head, a method is used to compare those two. The best approach is to detect the moment the signal changes its polarity, when it passes the zero line (the so-called "zero axis crossing"). In this way it is possible to eliminate the influence of the shape and size of the signal.

The second condition is that both signals to be compared must be equivalent, meaning that it is possible to compare two voltages or two currents but never a voltage and a current. In the present application, the comparison of two voltage is described.

FIG. 4 shows a part of such a circuit. The voltage on the coaxial inside line is taken via resistor R1. This resistor is an ohmic impedance only and does not give a phase shift. The signal is a sinusoid. Because of the size of the sinusoid can vary with the applied power, two so-called clamping diodes (d1 and d2) have been mounted to secure the next mounted components. Together with the resistor R1 they form a voltage divider that will cut off the top parts of the sinusoid. As only the zero axis crossing is relevant, this cut off has no effect on the comparison.

The result is a signal V1 whose phase equals the phase of the applied voltage to the sealing head.

To get another signal that corresponds to the phase of current to the sealing head, I can make use of a current transformer T1. The current of the internal conductor of the coax line is led through a ring core of a ferrite material. This material must be suitable for the applied high frequency. The magnetic field that is generated in this ring core induces a voltage in a second coil corresponding to the phase and size of the current supplied to the sealing head. It is a quality of this kind of transformer that it generates a phase shift to 90 degrees between the primary and the secondary coil. The signal of the secondary coil can be cut off in the same way as described earlier with resistor R2 and clamping diodes d3 and d4.

The return current, going through the outside coax line back to the RF generator, will however generate a voltage in the secondary coil too. This return current is counter directional and this would result in a zero voltage in the secondary coil. Therefore the coax sheath is grounded before and not after the transformer, making the return current pass through the ground connection instead of through the coax sheath. This coax sheath however is designed through the transformer to screen off the coax core and to prevent capacitive cross talk to the secondary coil, which would induce an extra phase shift.

This circuit results in a voltage V2 with a 90 degree phase shift exactly matching the applied current to the sealing head.

The zero axis crossing of the voltage on the sealing head (signal V1) and the current through the sealing head (signal V2) can be compared by means of a phase detecting circuit, a balance demodulator.

Figure 5:
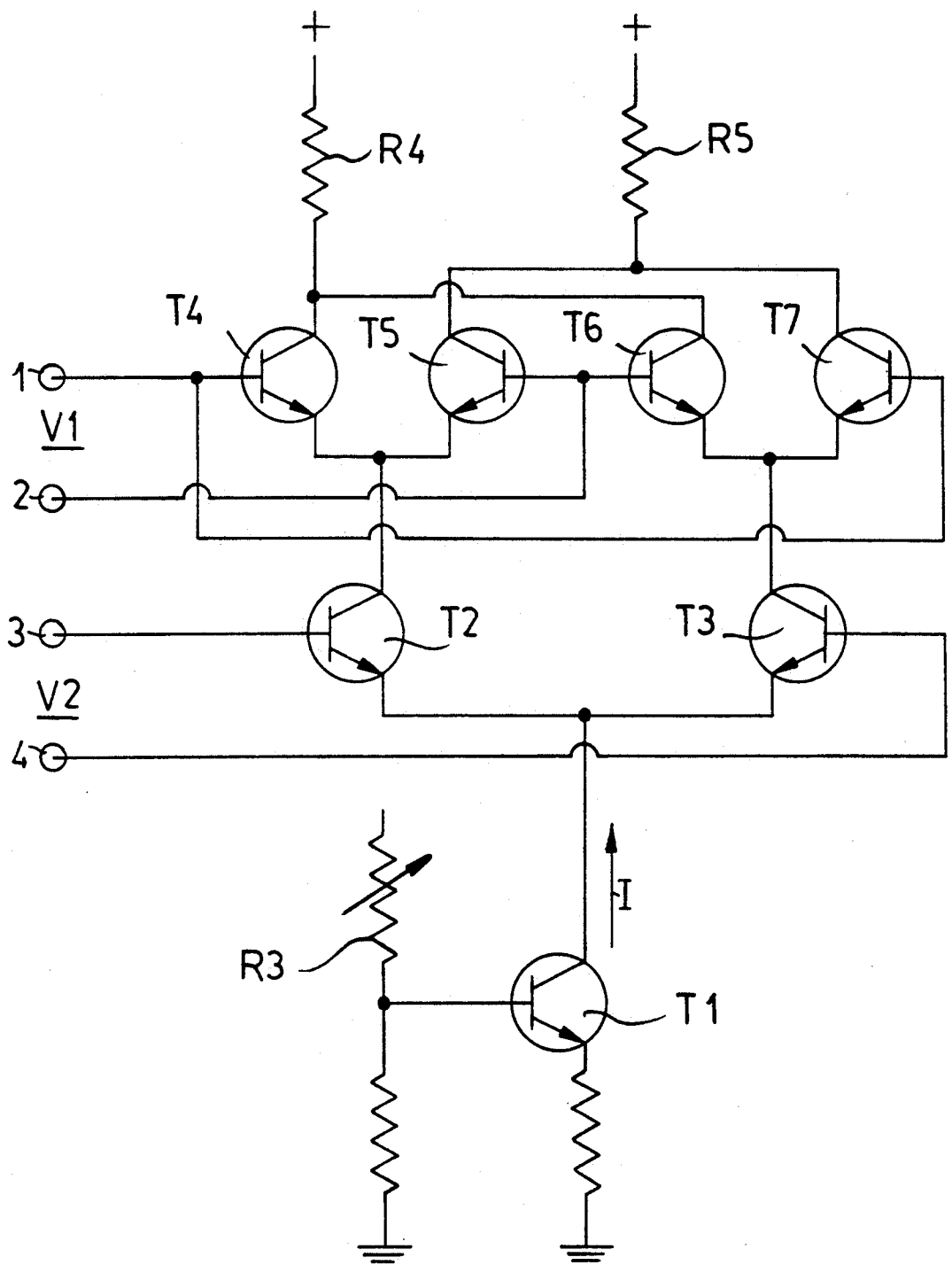
FIG. 5 is a circuit diagram of the phase demodulator or phase detection circuit of the present invention.

FIG. 5 shows the use of such a balance demodulator in a simplified form. Transistor T1 functions as a constant current source, where the current can be set by the resistor R3. The circuit further consists of three differential amplifiers T2/T3, T4/T5 and T6/T7. These amplifiers are saturated on their inputs so that they do not function in their proportional area, but will function as a switch. This is done by applying to them a relatively large signal; the signals V1 and V2 as earlier described. When signal V1 is applied to pin 1 and when pin 2 is grounded, the transistors T4 and T7 will conduct during the positive phase of V1 and T5/T6 will block. During the negative phase of V1, T5/T6 will conduct and T4/T7 will block.

The same situation will exist with T2/T3. During the positive phase of V2 on pin 3 (with pin 4 grounded) T2 will conduct and T3 will block. During the negative phase T3 will conduct and T2 will block. So the current I, coming from T1, can reach the resistors R4 and R5 through the different routes.

Figure 6:
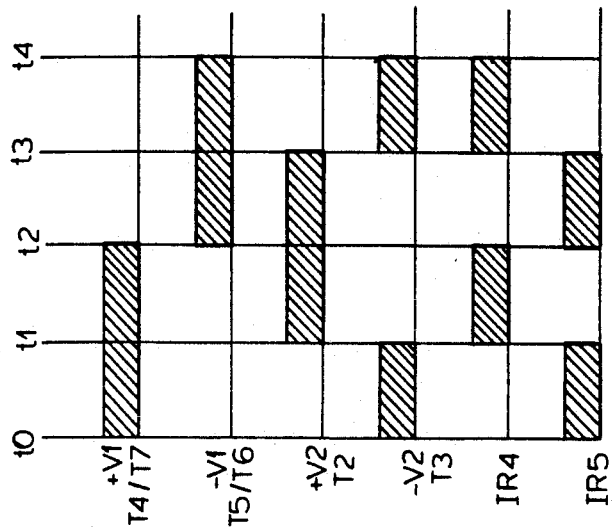

FIG. 6 shows what happens when the sealing head is tuned in resonance. The voltage over and the current through the sealing head are in phase. Because of the transformer, the signals V1 and V2 will however have an exact 90 degrees phase shift (meaning a quarter phase period).

V1 will open T4/T7 during a half period and T5/T6 during the other half period. V2 will open T2 during a half period and T3 during the other half period. The switching point of V2 however is exactly halfway of the switching points of V1. The current I passes during a quarter period through T2 and T4 to R4, a quarter period through T2 and T5 to R5, a quarter period through T3 and T7 to R5 and a quarter period through T3 and T6 to R4.

As can be seen the current, I will go during $2 \times \frac{1}{4}$ periods through R4 and during the other $2 \times \frac{1}{4}$ periods through R5.

Figure 7:
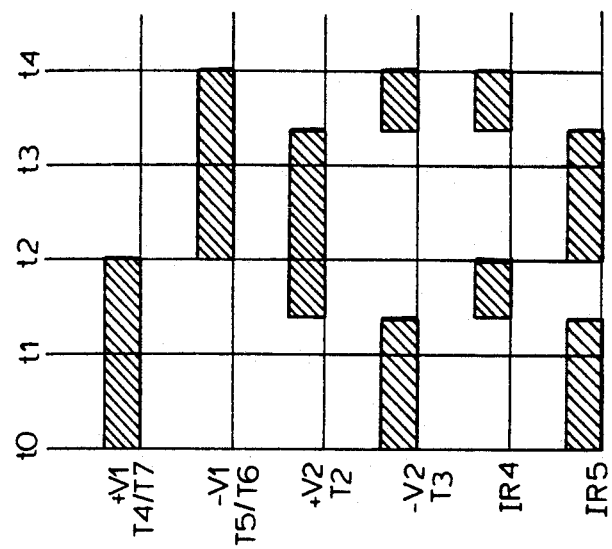

FIG. 7 shows the sealing head when it is tuned before the resonance point and the head will be inductive. This means that the current will lag the voltage and a phase shift will occur between the signal V1 and V2. The zero axis crossing of the V2 signal will be delayed. It is obvious that the balance between the current through R4 and R5 is disturbed. The current through R5 will last longer than that through R4.

Figure 8:
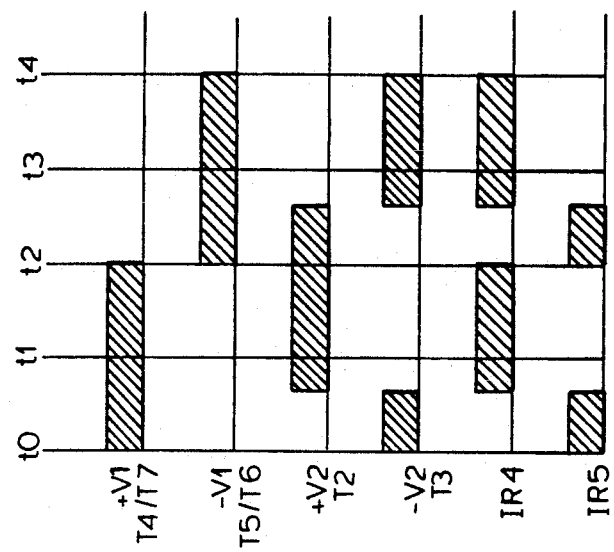
FIGS. 6–8 are diagrams showing the voltage relationships for the voltage and current phases with the sealing head in resonance, for the sealing head shifted inductively and for the sealing head shifted capacitively, respectively.

FIG. 8 shows the situation when the sealing head is tuned after the resonance point and the head will be capacitive. The current will lead the voltage and the zero axis crossing of V2 will be sooner. This means that the current through R5 will last a shorter time than that through R4. By mounting a capacitor across R4 and R5, this voltage can be averaged through time and we can say:

| When head is in resonance: | VR4 = VR5 |
| When head is before resonance: | VR4 < VR5 |

-continued

| When head is after resonance: | VR4 > VR5. |
| --- | --- |

Conclusion: The circuit generates an outgoing DC voltage difference that is zero when the sealing head is in resonance and that will increase when the sealing head gets further out of resonance. The polarity of the signal is determined by the inductive or capacitive behavior of the sealing head.

Figure 9:
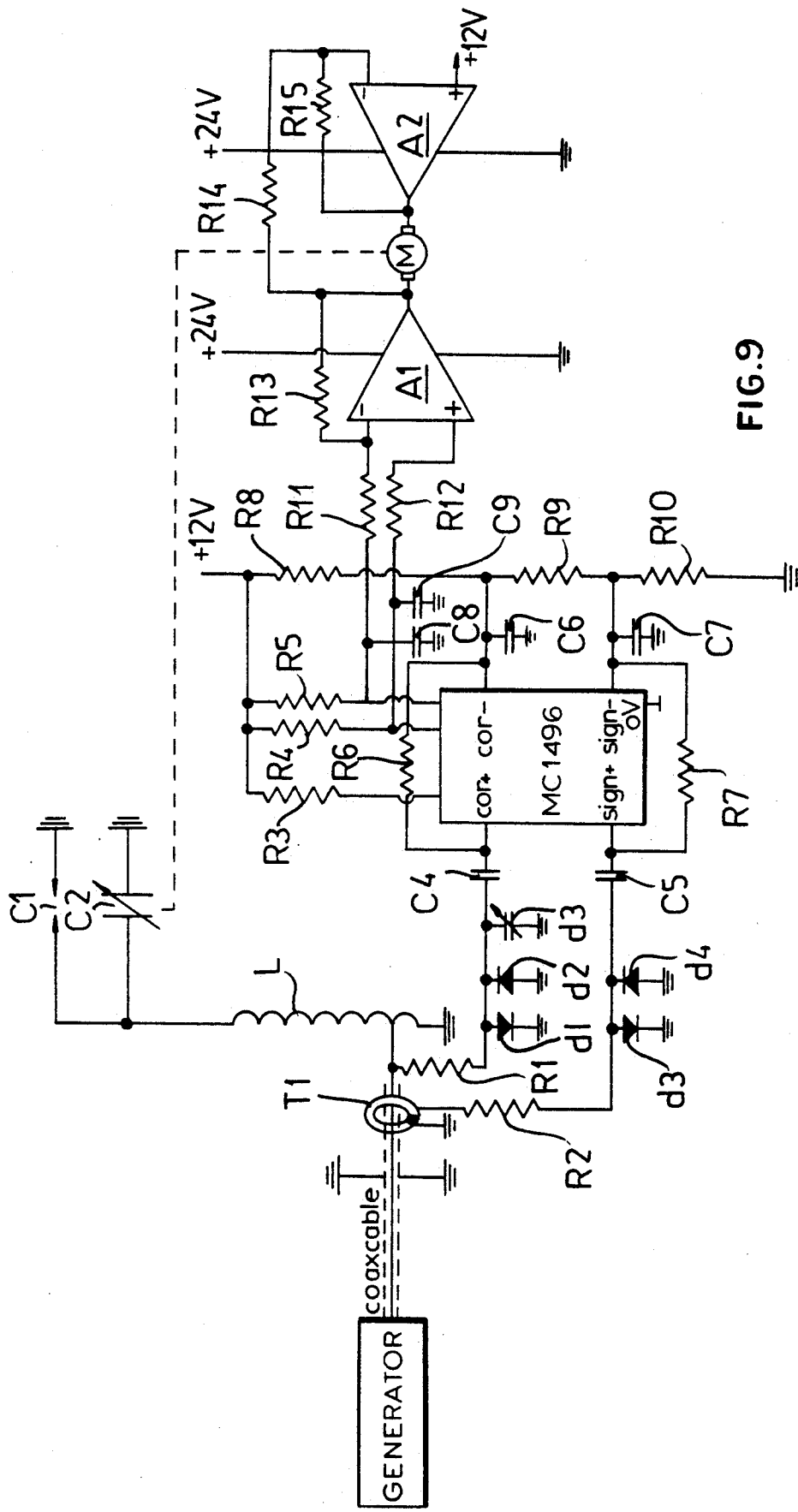
FIG. 9 is a circuit diagram of the auto-tuning circuit of the invention seen in greater detail.

FIG. 9 shows a practical example of a circuit according to the invention.

The sensors R1, R2 and d1-4 have already been discussed. C3 serves as a zero adjustment. With C3 I can introduce a little extra phase shift adjusting the outgoing voltage difference of a sealing head in resonance exactly to zero. I can make use of the Motorola IC MC 1496 as a balance demodulator and phase detector.

R3 determines the constant current through the differential amplifiers. R8, R9 and R10 have a function in adjusting the DC voltage and have no function on the AC voltage. C4 and C5 serve to block this DC voltage so it cannot reach the phase detector but they let the AC voltage pass undisturbed to the input of the differential amplifiers. The opposite input lines are earthed with C6 and C7.

R6 and R7 serve as low-impedance closures to prevent any influence from secondary capacities. The averaging circuit is formed by R5/C8 and R4/C9.

The output voltage difference is small and can therefore not drive a motor directly. The differential amplifier A1 amplifies this signal ten times and can even supply sufficient motor current. The output voltage can vary between 0 and 24 volts.

With R14/15 and A2, a voltage is produced that is equal in amplitude but opposite to make the motor rotate both ways. When the sealing head is in resonance, the output voltage difference will be zero. The output of A1 equals the output of A2 and the motor will not run.

When the sealing head falls out of resonance, for example due to a change of capacitance, a voltage difference will occur at the input of A1. The output of A1 will therefor change, as will the output of A2, but with a reversed polarity. The motor will be driven and it will make the capacitor C2 turn in such a way that the cause of the resonance disturbance is compensated. The circuit will thereby always compensate any disturbing effect on the sealing head, keeping it in resonance regardless of the cause of this detuning.

Any disturbing influence will be followed immediately by a counter-directional action, keeping the current through the sealing head and the voltage on the head in phase and the head itself in resonance. The reaction time turns out to be so short that even during sealing of very thin material, the sealing head stays in resonance, thereby causing an optimal intensity of field during the whole sealing process.

With the sealing device for the sealing of medical plastic articles of the invention, a phase detector ensures that the resonant circuit will stay tuned during the total sealing process. This has great advantages because the sealing quality will improve, less sealing power is needed, undesired radiation can be filtered better and the chance of electrical breakdown decreases.

I claim:

1. A device for sealing a medical plastic article, comprising:
   a sealing head having a pair of electrodes adapted to receive said article between them and provided with actuating means relatively displacing said electrodes to compress said article between the electrodes;
   a radio-frequency generator connected by a coaxial cable to said electrodes for energizing said electrodes with said article compressed between the electrodes to seal the article, said electrodes forming a primary capacitor in a tuned network of said sealing head; and
   circuit means connected to said electrodes and to said radio-frequency generator and including;
   an adjustable variable secondary capacitor for automatically correcting a detuning of said sealing head adjustment of said secondary capacitor,
   an electric motor connected to said variable capacitor for varying said capacitor to correct for said detuning, and
   a balance detector connected to said electric motor and including a phase detector for detecting relative offset of voltage and current phases supplied to said head as a measure of detuning of said sealing head.

2. The device defined in claim 1 wherein said balance detector has a first input receiving a signal representing a phase of a voltage applied across said electrodes, and a second input receiving a signal representing a phase of a current through said electrodes.

3. The device defined in claim 2 wherein said circuit means includes a current transformer, on a line of said coaxial cable connecting said radio-frequency generator with said network, connected to said second input.

4. The device defined in claim 3, further comprising clamping-diode means between said current transformer and said second input.

5. The device defined in claim 3 wherein said network includes an inductance, said radio-frequency generator being connected to said inductance.

6. The device defined in claim 5, further comprising a resistor connected between a line of said coaxial cable connecting said generator to said inductance and said first input of said balance detector.

7. A method of sealing a plastic medical article, comprising the steps of:
   (a) clamping a plastic medical article to be sealed between a pair of electrodes of a tuned network by relatively displacing said electrodes;
   (b) energizing said electrodes by connecting a radio-frequency generator to said tuned network in which said electrodes constitute a primary capacitor through a coaxial cable, thereby sealing said article;
   (c) detecting detuning of said network during sealing of the article by detecting a phase offset of voltage and current applied to said electrodes; and
   (e) in response to detection of detuning of said network, automatically correcting detuning by driving an electric motor adjusting a secondary capacitor in said network.

* * * * *